(12) United States Patent
Dalin et al.

(10) Patent No.: US 10,153,069 B2
(45) Date of Patent: Dec. 11, 2018

(54) WATER-TIGHT POWER CABLE WITH METALLIC SCREEN RODS

(71) Applicant: PRYSMIAN S.P.A., Milan (IT)

(72) Inventors: Carl-Johan Dalin, Milan (IT); Bo Johansson, Milan (IT)

(73) Assignee: PRYSMIAN S.P.A, Milan (IT)

( * ) Notice: Subject to any disclaimer, the term of this patent is extended or adjusted under 35 U.S.C. 154(b) by 0 days.

(21) Appl. No.: 15/556,834

(22) PCT Filed: Mar. 20, 2015

(86) PCT No.: PCT/EP2015/056016
§ 371 (c)(1),
(2) Date: Sep. 8, 2017

(87) PCT Pub. No.: WO2016/150473
PCT Pub. Date: Sep. 29, 2016

(65) Prior Publication Data
US 2018/0047481 A1   Feb. 15, 2018

(51) Int. Cl.
*H01B 9/02* (2006.01)
*H01B 7/282* (2006.01)
*H01B 7/285* (2006.01)

(52) U.S. Cl.
CPC ............. *H01B 7/282* (2013.01); *H01B 7/285* (2013.01); *H01B 7/2825* (2013.01); *H01B 9/02* (2013.01); *Y02A 30/14* (2018.01)

(58) Field of Classification Search
CPC ................................. H01B 9/027; H01B 11/04
(Continued)

(56) References Cited

U.S. PATENT DOCUMENTS

| 4,621,169 A | * | 11/1986 | Petinelli | ................... H01B 1/22 166/241.3 |
| 5,010,209 A | | 4/1991 | Marciano-Agostinelli et al. | |

(Continued)

FOREIGN PATENT DOCUMENTS

| EP | 0 416 728 | 3/1991 |
| GB | 2 113 453 A | 8/1983 |

(Continued)

OTHER PUBLICATIONS

International Search Report form the European Patent Office in corresponding International Application No. PCT/EP2015/056016 dated Dec. 17, 2015.

(Continued)

*Primary Examiner* — Chau N Nguyen
(74) *Attorney, Agent, or Firm* — Finnegan, Henderson, Farabow, Garrett & Dunner, L.L.P.

(57) ABSTRACT

A multi-phase power cable includes: a plurality of phase cores, each including an insulated electric conductor; a screen assembly including a metallic screen rod; a moisture barrier metallic sheet enclosing the plurality of phase cores and the screen rod; an outer jacket radially outer to the moisture barrier metallic sheet; and a multilayer arrangement including a first, second and third semiconducting water swellable layer surrounding the phase cores and in radial internal position with respect to the moisture barrier metallic sheet and in electric contact therewith, the screen assembly being arranged between the second and third semiconducting water swellable layers.

16 Claims, 1 Drawing Sheet

(58) Field of Classification Search
USPC .................................. 174/113 R, 120 SC, 116
See application file for complete search history.

(56) References Cited

U.S. PATENT DOCUMENTS

| | | | | |
|---|---|---|---|---|
| 6,034,162 | A * | 3/2000 | Mizutani | C08K 5/09 428/921 |
| 7,053,309 | B2 * | 5/2006 | Efraimsson | H01B 7/288 174/102 SC |
| 7,411,132 | B1 * | 8/2008 | Medling | H01B 7/288 174/113 R |
| 7,469,470 | B2 * | 12/2008 | Cusson | H01B 7/20 156/47 |
| 8,039,749 | B2 * | 10/2011 | Okano | H01B 11/1008 174/113 R |
| 2004/0065456 | A1 | 4/2004 | Belli et al. | |
| 2005/0217890 | A1 | 10/2005 | Efraimsson et al. | |

FOREIGN PATENT DOCUMENTS

| | | |
|---|---|---|
| WO | WO 01/46965 A1 | 6/2001 |
| WO | WO 2011/092533 A1 | 8/2001 |
| WO | WO 02/03398 A1 | 1/2002 |
| WO | WO 2004/006272 A1 | 1/2004 |
| WO | WO 2004/066317 A1 | 8/2004 |
| WO | WO 2004/066318 A1 | 8/2004 |
| WO | WO 2007/048422 A1 | 5/2007 |
| WO | WO 2008/058572 A1 | 5/2008 |

OTHER PUBLICATIONS

Written Opinion of the International Searching Authority from the European Patent Office in corresponding International Application No. PCT/EP2015/056016, dated Dec. 17, 2015.

* cited by examiner

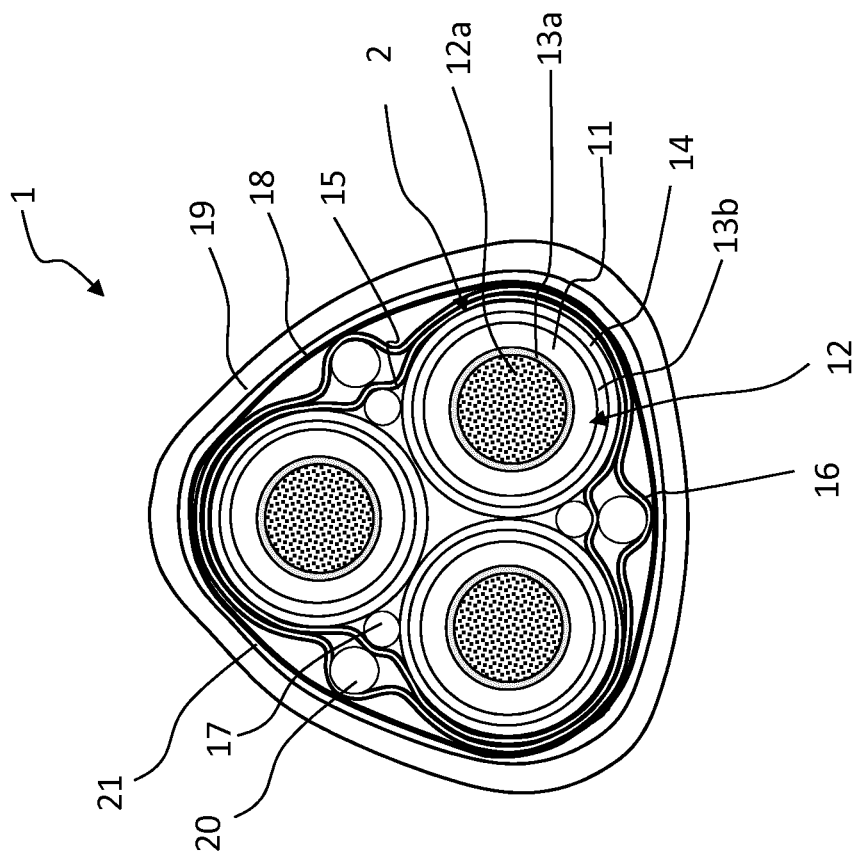

WATER-TIGHT POWER CABLE WITH METALLIC SCREEN RODS

CROSS REFERENCE TO RELATED APPLICATION

This application is a national phase application based on PCT/EP2015/056016, filed Mar. 20, 2015, the content of which is incorporated herein by reference.

BACKGROUND

The present invention relates to the field of power cables for medium voltage or high voltage. In particular, the present invention relates to a water-tight cable with metallic screen rod.

PRIOR ART

Power cables for high voltages generally comprise a conductor, an inner semiconducting layer, an insulating layer, an outer semiconducting layer, a metal shield or screen, and a jacket.

The metal screen is provided for ensuring that the outer conducting layer is maintained at electrical earth potential by conducting any capacitive eddy currents that may arise and for draining short circuit currents under fault conditions. The metal screen can be in form of tape or optionally braided wire surrounding the conductor insulation.

When the cable is a multi-phase cable (e.g. a three-phase cable), it is made of a plurality of phase cores, each comprising an insulated electric conductor, stranded together; in such arrangement, the metal screen comprises one or more conductor rods stranded together with the phase cores.

The screen is made of an electrically conductive metal, typically copper or aluminium. Aluminium has the advantage of being lighter and cheaper than copper but it is prone to oxidation and corrosion in the presence of moisture, thus cables comprising aluminium screen should be endowed with a moisture or water barrier to prevent water penetration to reach the aluminium screen.

As a moisture or water barrier, a longitudinally sealed sheet of metal or plastic/metal laminate can be provided around the phase cores.

WO 2004/006272 discloses a cable comprising insulated conductors, where an inner conducting layer, insulation and an outer conducting layer are arranged around each conductor. Sectorial shield strips with one or several longitudinal shield aluminium wires baked into them are present in the space between the outer conducting layer and an outer foil of metal such as aluminium, which strips are arranged to function as a metallic shield. Aluminium foil is partially or wholly in direct galvanic contact with the aluminium shield wires. A sliding tape may also have been inserted between the shield strips and the outer metal foil, and may have swelling properties. In order for the construction to be longitudinally water-tight, cavities under the aluminium foil are filled, preferably with swelling powder/swelling strips. A plastic jacket may be of a plastic material that has high strength at high temperatures, such as cross-linked polyethylene.

SUMMARY OF THE INVENTION

The Applicant has tackled the problem of providing a multi-phase power cable with metallic screen rods and a longitudinally sealed metallic sheet used as moisture barrier. In particular, the Applicant faced the problem of establishing an electric continuity between the moisture barrier metallic sheet and the metallic rods, as required to avoid corona discharges, without directly contacting sheet and rods, which can cause rods displacement during manufacturing and/or cable bending. Also, empty cavities under the moisture barrier sheet should be minimized to guarantee the longitudinal water-tightness.

The Applicant has realized that in a multi-phase cable, electric continuity among metallic screen rods, phase cores and the moisture barrier metallic sheet surrounding them can be obtained by providing a multilayer arrangement of at least three water swellable semiconducting layers between the cable core and the moisture barrier metallic sheet, in which the metallic screen rods are arranged between two of said layers.

The provision of this multilayer arrangement establishes the sought electric continuity between metallic screen rods and moisture barrier sheet while avoiding the direct contact therebetween, while substantially filling the cavities among the elements under the moisture barrier sheet.

According to a first aspect, the present invention provides a multi-phase power cable comprising:

a plurality of phase cores, each including an insulated electric conductor;

a screen assembly comprising a metallic screen rod;

a moisture barrier metallic sheet enclosing the plurality of phase cores and the screen rod;

an outer jacket radially outer to said moisture barrier metallic sheet; and a multilayer arrangement comprising a first, second and third semiconducting water swellable layers surrounding the phase cores and in radial internal position with respect to the moisture barrier metallic sheet and in electric contact therewith, the screen assembly being arranged between said second and third semiconducting water swellable layers.

Advantageously, the power cable of the invention comprises a multilayer arrangement comprising:

a) a first water swellable semiconducting layer provided around each of the phase cores, b) a second water swellable semiconducting layer surrounding all of the phase cores, in a radial internal position with respect to the screen assembly; and c) a third water swellable semiconducting layer provided around all of the phase cores and the screen assembly.

By "phase core" it is meant a metallic electric conductor sequentially surrounded by an inner semiconducting layer, an insulating layer and an outer semiconducting layer sequentially in contact with one another.

Preferably, a first water swellable semiconducting layer is provided around and in contact with the outer semiconducting layer of each phase core.

The semiconducting water swellable layers are preferably in form of tapes.

Preferably the screen assembly comprises a plurality of metallic screen rods. A metallic screen rod can be made of copper, aluminium or a composite thereof; aluminium screen rod being preferred.

The moisture barrier metallic sheet of the power cable of the invention is preferably a longitudinally folded sheet, overlapped and sealed, for example by glue, around the phase cores, the screen assembly and the semiconducting water swellable layers.

Preferably, the moisture barrier metallic sheet of the cable of the invention can be made of aluminium or, more preferably, of a laminate comprising an aluminium layer and polymeric layer. The polymeric layer is advantageously positioned facing towards the outer jacket of the cable and in contact thereto.

As the polymeric layer of the laminate of the moisture barrier metallic sheet is positioned in contact with the outer jacket, it improves the adhesion between the outer jacket and moisture barrier sheet and contributes to the moisture barrier sheet water-tightness, especially at the overlapping and sealed margins, which is of importance particularly when the cable bends.

Advantageously, the moisture barrier metallic sheet has a thickness of at least 0.15 mm. Preferably, the moisture barrier metallic sheet has a thickness of 0.30 mm at most.

Preferably, the outer jacket of the power cable is made of a material based on an extruded polymer, more preferably extruded non-crosslinked polyethylene. Advantageously, the non-crosslinked polyethylene has a density of at least 0.925 g/cm$^3$. Advantageously, the non-crosslinked polyethylene has a Shore D hardness of at least 55, preferably up to 65.

Preferably, the metallic screen rods of the screen assembly are arranged between adjacent phase cores and are stranded together with them. One or more metallic screen rods can be provided between two adjacent phase cores.

Advantageously, the power cable further comprises filling strings arranged between adjacent phase cores in radial internal position with respect to the metallic screen rods. The filling strings act as support for the screen rods and maintain them close to the moisture barrier metallic sheet.

Preferably, the filling strings are provided in radial internal position with respect to the second water swellable semiconducting layer.

In the present description and claims as "semiconducting layer" it is meant a layer made of a material having semiconductive properties, such as a polymeric matrix added with, e.g., carbon black such as to obtain a volumetric resistivity value, at room temperature, of less than 500 Ω·m, preferably less than 20 Ω·m. The amount of carbon black can range between 1 and 50% by weight, preferably between 3 and 30% by weight, relative to the weight of the polymer.

BRIEF DESCRIPTION OF THE DRAWING

The present invention will become fully clear by reading the following detailed description, to be read by referring to the accompanying drawing, wherein:

FIG. 1 is a cross-section view of a cable according to an embodiment of the present invention.

DESCRIPTION OF EXAMPLES

FIG. 1 is a cross-section of a three-phase power cable according to an embodiment of the present invention. The cable is generally designed by reference number 1.

Cable 1 is an energy cable, in particular for medium or high voltage. More specifically, cable 1 is for alternate current (AC) transport, preferably for terrestrial (possibly underground) applications.

In the present description and claims:
with "medium voltage" or MV it is meant to indicate voltages between 1 kV and 36 kV;
with "high voltage" or HV it is meant to indicate voltages higher than 36 kV; such definition encompasses a range sometimes indicated as "extra high voltage" (EHV), used for cables capable of transporting voltages higher than 200 kV;
the terms "radial" and "longitudinal" are used to indicate a direction, respectively, perpendicular and parallel to a reference longitudinal axis of the cable ends; the expressions "radially inner" and "radially outer" are used to indicate a position along a radial direction with respect to the abovementioned longitudinal axis;
a size along the axial direction is termed "length", while a size along the radial direction is termed "thickness";
the terms "conductive", "insulated", "connected" and other terms that might have a thermal or mechanical meaning are used in the electrical meaning, unless otherwise specified.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Cable 1 comprises a conductive core 2. In the depicted case, conductive core 2 comprises three phase cores 12. However, the number of phase cores can be higher or lower than three.

Each phase core 12 comprises an electric conductor 12a made of a plurality of filaments of copper, aluminium or a composite thereof. Alternatively, the electric conductor 12a can be made of a single rod in one of the just mentioned metals. The conductors can have resistance and number of wires according to IEC 60228 (3$^{rd}$ ed. 2004-11).

Each of the electric conductors 12a is sequentially surrounded by an inner semiconducting layer 13a, an insulating layer 11 and an outer semiconducting layer 13b, in contact with one another. The electric conductor 12a surrounded by said layers is referred to as phase core 12.

Inner semiconducting layer 13a, insulating layer 11 and outer semiconducting layer 13b are preferably made of extruded polymeric material. Examples of suitable polymeric materials are polyethylene homopolymers or copolymers or thermoplastic materials, for example propylene-based materials as disclosed in WO 02/03398, WO 04/066317, WO 04/066318, WO 07/048422, WO11/092533 and WO 08/058572. The semiconducting layers material further comprises a suitable amount of a conductive filler, for example carbon black.

The phase cores 12 are stranded together and form the conductive core 2. A first layer 14 of water swellable semiconducting material is provided around each phase core 12, in particular around and in contact with its outer semiconducting layer 13b.

The first layer 14 of water swellable semiconducting material is preferably in a form of a tape longitudinally folded around each outer semiconducting layer 13b.

Alternatively, the first layer 14 of water swellable semiconducting material is in form of a tape wound around each outer semiconducting layer 13b according to a closed helix with a certain overlapping area in order to avoid surface portions without water swellable semiconducting material even when the cable is bent. Anyway, a small percentage of areas possibly not covered by water swellable material can be tolerated.

The water swellable semiconducting material of the first layer 14 can be a polymer material, for example a compound based on a polyester or an ethylene copolymer such as ethylene/vinyl acetate copolymer, filled with a conductive filler, for example carbon black, and a water swellable powder, for example sodium polyacrylate powder.

The cable 1 according to the present invention comprises a screen assembly configured for complying with safety requirements against short-circuits. The electrical function of the screen assembly is to drain the capacitive charging current and induced circulating currents generated under normal operating conditions. The screen also drains short circuit currents under fault conditions.

The screen assembly may comprise one or more metallic rods 20, preferably at least partially made of aluminium. In the embodiment of FIG. 1 three rods 20 have been depicted, each of them being arranged in the interstice between two adjacent phase cores 12. Alternatively, a plurality of metallic rods 20 can be present between two adjacent phase cores 12, for example two or more metallic rods 20.

In one embodiment, each rod 20 has a diameter of 3.0 mm. The screen rod dimension and number can be selected by the skilled person depending on the specific dimension of the cable and on the performance thereof.

The cable 1 may also comprise a number of filling strings 17. Suitably, one filling string 17 is provided between two adjacent phase cores 12 in radial internal position with respect to any metallic rod 20 present in the same interstice.

The filling string 17 opposes the trend of rod/s 20 to be wedged into the interstice between two adjacent conductors 12 and helps to increase the electrical contact between rod/s 20 and the moisture barrier metallic sheet 18 which will be disclosed hereinbelow.

Filling strings 17 can be made of polymeric material, for example polyethylene.

Cable 1 further comprises a second layer 15 of water swellable semiconducting material. Such second layer 15 is provided around the conductive core 2, so surrounding all of the phase cores 12 and the respective first layers 14 of water swellable semiconducting material. The second layer 15 is at least partially in electrical contact with the first layers 14 of water swellable semiconducting material.

In embodiments, like the one of FIG. 1, with filling strings 17, the second layer 15 of water swellable semiconducting material is preferably provided in radial external position with respect to filling strings 17, too.

The second layer 15 can have the features and constructions already set forth above in connection with the first layer 14 of water swellable semiconducting material.

Cable 1 further comprises a third layer 16 of water swellable semiconducting material. Third layer 16 is provided around the conductive core 2, so surrounding all of the phase cores 12 and the respective first layers 14 of water swellable semiconducting material, the second layer 15 of water swellable semiconducting material and the screen rods 20. Third layer 16 is at least partially in electrical contact with the second layer 15 of water swellable semiconducting material.

The third layer 16 can have the features and constructions already set forth above in connection with the first layer 14 of water swellable semiconducting material.

The three water swellable semiconducting tapes, besides avoiding the longitudinal moisture or water propagation/contact, ensure a proper electrical contact among moisture barrier metallic sheet, screen assembly and cable phase cores.

Radially outer to the third layer 16 a moisture barrier metallic sheet 18 is provided in order to render the cable water tight. In particular, the moisture barrier metallic sheet 18 can be a laminate aluminium/polymer where the polymer layer is provided in radial external position with respect to the aluminium layer. Advantageously, the moisture barrier metallic sheet 18 is longitudinally wrapped around the underlying cable structures, overlapped and sealed by a glue or the like. Overlap can be between 10 mm and 30 mm, for example 20 mm.

The moisture barrier metallic sheet preferably has a thickness of at least 0.15 mm. The metallic sheet 18 provides an efficient radial barrier to prevent moisture or water to diffuse into the underlying cable structures.

Profitably, according to the present invention electric contact between screen rods 20 and moisture barrier metallic sheet 18 is guaranteed by the multilayer arrangement comprising first, second and third layers 14, 15 and 16. Also, the presence of this multilayer arrangement minimizes the presence of cavities in radial internal position with respect to the moisture barrier metallic sheet 18.

Cable 1 according to the present invention further comprises an outer jacket 19 radially outer to the moisture barrier metallic sheet 18. Preferably, outer jacket 19 is an extruded polymeric jacket. Preferably, the polymeric jacket 19 is made of non-crosslinked polyethylene having robust mechanical properties. Preferably, the polyethylene of polymeric jacket 19 is a high density polyethylene (HDPE).

Preferably, the outer jacket 19 material has a Shore D hardness of at least 55. This feature makes the outer jacket capable of exerting a lasting grip over the moisture barrier metallic sheet minimizing the voids inside the cable and improving the moisture barrier performance of the this sheet.

During the manufacture of the cable, when the moisture barrier metallic sheet comes out of a sheet tape former, the shape of the sheet is substantially circular. When the substantially circular sheet and the substantially triangular core pass by the extruder head delivering the polymeric material of the outer jacket, the pressure exerted by the extrusion head compresses the surface of the metallic sheet. As the cable passes through a cooling trough, the outer jacket shrinks to the shape of the conductors. Basically the shrinkage of the outer jacket material causes the moisture barrier metallic sheet to conform to the shape of the triangular cable core.

As mentioned above, in order to solve problems caused by insufficient electrical contact between the moisture barrier metallic sheet and the metallic screen rods a filling string was applied directly beneath the screen rods to push the rods against the moisture barrier metallic sheet. This helps avoiding the problems of corona discharge.

The cable of the invention was tested according to HD605 S2 2.4.9 (2008) and its design is suitable for avoiding water or moisture longitudinal penetration. The tests showed that metallic screen rods together with aluminium laminated sheet is an acceptable solution for MV application and that there are minimal or no risk of corrosion or oxidation of the screen metal, even when aluminium, as long as the moisture barrier, provided by the aluminium sheet, is undamaged.

The invention claimed is:

1. A multi-phase power cable comprising:
   a plurality of phase cores, each phase core comprising an insulated electric conductor and a first semiconducting water swellable layer completely surrounding the insulated electric conductor;
   a screen assembly comprising at least one metallic screen rod;
   a moisture barrier metallic sheet enclosing the plurality of phase cores and the screen assembly;
   an outer jacket radially outer to the moisture barrier metallic sheet; and
   a multilayer arrangement comprising:
   a second semiconducting water swellable layer and a third semiconducting water swellable layer, the multilayer arrangement surrounding the plurality of phase cores and being in a radial internal position with respect to the moisture barrier metallic sheet, the second and third semiconducting water swellable layers being in electric contact with the moisture barrier metallic sheet and the screen assembly, the screen assembly being arranged between said second and third semiconducting water swellable layers.

2. The multi-phase power cable of claim 1, wherein:
the second semiconducting water swellable layer surrounds all of the phase cores and is provided in a radial internal position with respect to the screen assembly; and
the third semiconducting water swellable layer is provided around all of the phase cores and the screen assembly.

3. The multi-phase power cable of claim 1, wherein the semiconducting water swellable layers are in a form of tapes.

4. The multi-phase power cable of claim 1, wherein:
the at least one metallic screen rod is one of a plurality of metallic screen rods.

5. The multi-phase power cable of claim 4, wherein the plurality of metallic screen rods are arranged in interstices between two adjacent phase cores.

6. The multi-phase power cable of claim 1, wherein the at least one metallic screen rod is made of aluminium.

7. The multi-phase power cable of claim 1, wherein the moisture barrier metallic sheet is a sheet longitudinally folded around the phase cores, the screen assembly and the semiconducting water swellable layers.

8. The multi-phase power cable of claim 1, wherein the moisture barrier metallic sheet is made of a laminate comprising an aluminium layer and polymeric layer.

9. The multi-phase power cable of claim 8, wherein the polymeric layer is positioned facing toward the outer jacket and in contact therewith.

10. The multi-phase power cable of claim 1, wherein the outer jacket is made of extruded non-crosslinked polyethylene.

11. The multi-phase power cable of claim 10, wherein the non-crosslinked polyethylene has a density of at least 0.925 g/cm$^3$ and a Shore D hardness of at least 55.

12. The multi-phase power cable of claim 1, comprising filling strings arranged between adjacent phase cores in a radial internal position with respect to the at least one metallic screen rod.

13. The multi-phase power cable of claim 12, wherein the filling strings are provided in a radial internal position with respect to the second water swellable semiconducting layer.

14. The multi-phase power cable of claim 1, wherein the at least one metallic screen rod is arranged in an interstice between two adjacent phase cores.

15. A multi-phase power cable comprising:
a plurality of phase cores, each phase core comprising an insulated electric conductor;
a screen assembly comprising at least one metallic screen rod;
a moisture barrier metallic sheet enclosing the plurality of phase cores and the screen assembly;
an outer jacket radially outer to the moisture barrier metallic sheet; and
a multilayer arrangement comprising:
a first semiconducting water swellable layer; and
second and third semiconducting water swellable layers surrounding the phase cores and in a radial internal position with respect to the moisture barrier metallic sheet and in electric contact therewith, wherein
the screen assembly is arranged between the second and third semiconducting water swellable layers;
the first semiconducting water swellable layer is provided around each of the phase cores;
the second semiconducting water swellable layer surrounds all of the phase cores and provided in a radial internal position with respect to the screen assembly; and
the third semiconducting water swellable layer is provided around all of the phase cores and the screen assembly.

16. A multi-phase power cable comprising:
a plurality of phase cores, each phase core comprising an insulated electric conductor;
a screen assembly comprising at least one metallic screen rod;
a moisture barrier metallic sheet enclosing the plurality of phase cores and the screen assembly;
an outer jacket radially outer to the moisture barrier metallic sheet;
a multilayer arrangement comprising:
a first semiconducting water swellable layer; and
second and third semiconducting water swellable layers surrounding the phase cores and in a radial internal position with respect to the moisture barrier metallic sheet and in electric contact therewith, and
filling strings arranged between adjacent phase cores in a radial internal position with respect to the at least one metallic screen rod,
wherein
the screen assembly is arranged between the second and third semiconducting water swellable layers; and
the filling strings are provided in a radial internal position with respect to the second water swellable semiconducting layer.

* * * * *